Oct. 4, 1949.  G. J. MUCHER  2,483,779
MOUNTING FOR ROTARY SHAFTS
Filed June 27, 1945
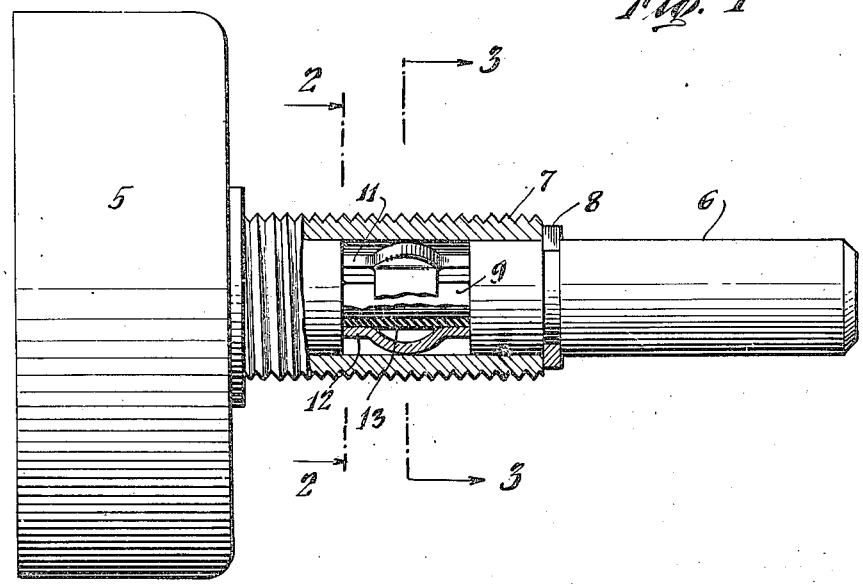
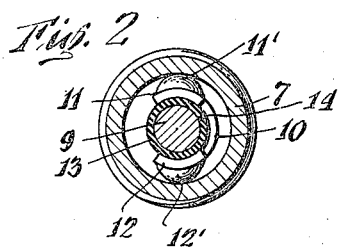
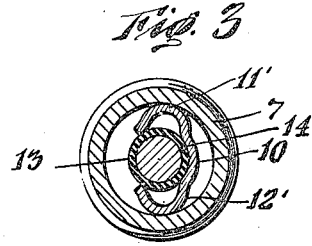
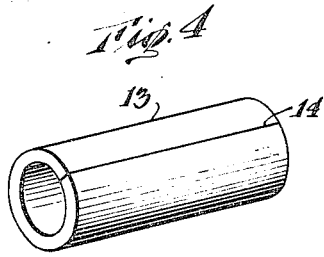
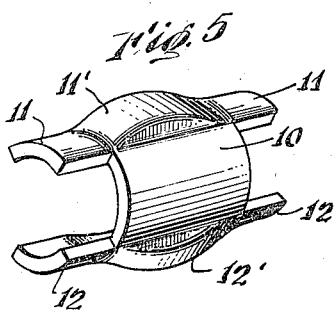
INVENTOR
George J. Mucher
BY Duell, Kane & Smoot
ATTORNEYS Patented Oct. 4, 1949

2,483,779

UNITED STATES PATENT OFFICE 2,483,779

MOUNTING FOR ROTARY SHAFTS

George J. Mucher, Brooklyn, N. Y., assignor to Clarostat Mfg. Co., Inc., Brooklyn, N. Y., a corporation of New York Application June 27, 1945, Serial No. 601,894

4 Claims. (Cl. 188—83)

This invention relates to a mounting to be applied to the operating shafts of controls such as rheostats and potentiometers. According to a preferred and specific embodiment, the invention contemplates a friction or torque provision for such shafts and by means of which certain desirable results are achieved.

This application is a continuation in part of my application for Mounting filed May 19, 1945, Serial Number 594,775, now abandoned.

It is an object of the invention to furnish a unit of this character which may readily be applied to a shaft or control member as a consequence of which the danger of accidental shifting of that control member will be reduced to a minimum. Accordingly, a unit coupled thereto will remain in a position to which it has been manually adjusted. At the same time, the adoption of the teachings of the present invention will in no ways interfere with the proper and easy operation of the mechanism coupled to the actuating shaft or control.

A further object is that of accomplishing the foregoing results by means of a simple and efficient structure and without the need of resorting to close tolerances and machining operations.

Another object is that of providing a mechanism by means of which wear will be reduced to a minimum so that a unit incorporating these advantages will have a long, effective life.

Still another object is that of furnishing a structure of this type which may readily be manufactured in large quantities and which, moreover, may be applied to or be removed from a shaft or its equivalent with minimum effort and without the use of special tools.

With these and other objects in mind, reference is had to the attached sheet of drawings illustrating one practical embodiment of the invention, and in which:

Fig. 1 is a partly sectional side elevation of an assembly with certain of the parts thereof broken away to disclose underlying structures;

Figs. 2 and 3 are transverse sectional views taken respectively along the lines 2—2 and 3—3 and in the direction of the arrows as indicated in Fig. 1;

Fig. 4 is a perspective view of one form of sleeve which may be a part of the mounting; and Fig. 5 is a similar view of a suitable type of friction spring by means of which the teachings of the present invention may be achieved.

An assembly such as is herein contemplated is of primary utility when applied to a unit such as a potentiometer, rheostat or similar electrical control. As will hereinafter be apparent, the mounting might be otherwise employed and especially if in a contemplated assembly a shaft is included. Where employed, it will serve to provide a torque factor such that accidental shifting of the parts will not occur. Also, where so employed, undue wear of the parts will not occur even if such parts be formed of soft metal such as brass.

As in Fig. 1, numeral 5 indicates the unit to be controlled and within the housing of which various mechanical and electrical elements are disposed. These elements are capable of being shifted with respect to each other by, for example, a shaft 6 extending from the casing and which is rotated with respect to the same. A bushing 7 may also extend from this casing and mount a nut and/or flange (not shown) by means of which the casing may be secured in clamped position with reference to an apertured mounting panel or its equivalent.

A split ring 8 fitting into a groove on the shaft 6 may bear against the outer edge of bushing 7. This will prevent inward thrusts on the shaft being transmitted to the mechanism within the casing 5. Outward thrusts may be prevented by a similar structure conveniently within the casing and which structure has not been shown.

As is well understood by those skilled in the art, there has been a tendency in units of this type for the shaft 6 to accidentally turn with respect to the casing 5. This tendency has been particularly noticeable where the unit is subjected to vibration. As is obvious, especially violent vibration factors are encountered in the operation of airplanes as well as in the case of gun-fire. A unit of the present type frequently forms a part of apparatus disposed in locations within airplanes or adjacent gun mounts.

By the present invention, the tendency of the shaft to accidentally turn is resisted by increasing the torque resistance of the latter. At the same time, no complicated and involved constructions are necessary to achieve this result and the resistance factor will not be sufficiently great to cause any difficulties in connection with manual and efficient turning of the shaft. Moreover, by the present invention the movements of the shaft will, to a certain extent, be cushioned so that vibration transmitted through the latter is reduced to a minimum, and the shaft will not be subjected to undue wear.

The foregoing results may be achieved by preferably grooving the shaft within the bushing 7 and as has been indicated by the reference numeral 9. This need not necessarily be resorted to but is a preferred expedient. To the reduced or grooved portion thus furnished there is applied a body of material. This body conveniently takes the form of a fiber sleeve. A friction element preferably in the form of a clip or spring in turn engages this sleeve. This element also engages the inner face of the bushing. Therefore, with the sleeve either fixed with respect to the shaft or at least frictionally engaging the same, it follows that a braking effect is achieved. Moreover, as a function of this structure, vibration may be reduced to a considerable extent without resultant complication to the design.

A preferred form of the clip or spring initially follows the configuration of an I-shaped blank. As shown in Fig. 5, the blank—which is conveniently formed of bronze—is subjected to a number of shaping operations such that its head and base portions 11 and 12 are transversely curved to generally conform to the diameter of the shaft portion to which they are to be applied. Also, these head and base portions are "bumped-up" or longitudinally curved as generally indicated by the reference numerals 11' and 12'. These parts are connected by a shank 13 which is curved to generally conform to the curvature of the reduced portion of the shaft 6, although preferably it is of slightly larger diameter. Thus, a spring action is incorporated in the unit and this has the result that the wing or arm portions of the base and head tend to engage with their inner faces any surfaces adjacent which they are disposed.

As afore brought out, the shaft 6 is preferably formed with a reduced portion. Thus, together with the bushing 7, provides what might be termed a housing or compartment. At this point, the shaft is encircled by a body of suitable material which preferably takes the form of a sleeve 13 as in Fig. 4. This sleeve is conveniently formed of fiber and is longitudinally slitted as at 14 so as to be readily capable of application to the reduced shaft portion. Being formed of this material, the sleeve will necessarily have substantial frictional contact with the shaft. In fact, this contact—either as a consequence of the materials employed or, if desired, by the action of a supplementary or auxiliary agent—might result in substantially no rotation occurring on the part of the sleeve with respect to the shaft.

Preferably, from its leading to its trailing edge, the clip or spring element as shown in Fig. 5 extends slightly in excess of 180° and so that the parts 11 and 12 will lie in firm contact with the outer face of the sleeve after the spring unit has been clipped into position. As is apparent, substantially no force will be required to either mount or dismount the spring.

When in applied position, the shank 10 will lie within the groove 9. The wing portions 11 and 12 will be caused to engage with the surfaces of the sleeve which is, in turn, engaging the shaft. According to the amount of extension of the portions 11' and 12', the degree of engagement will be more or less intimate. This will occur because the extended portions will bear more or less firmly against the inner face of the bushing. Depending upon the intensity with which the parts frictionally engage with each other a greater or lesser amount of torque resistance will be imparted to the shaft 6. This is aside from the fact that the clip will tend to yieldingly support the shaft.

Accordingly, it is obvious that, among others, the several objects of the invention as afore noted are achieved. It will be understood that numerous modifications and rearrangements of structure may be made from that illustrated without departing from the spirit of the invention as set forth in the following claims.

I claim:

1. A mounting for a rotary shaft comprising a supporting member encircling the shaft and a unitary resilient body interposed between said shaft and said supporting member for permanent contact with these two parts, the said resilient body including a pair of roughly oppositely arranged arms extending lengthwise of the shaft and a cylinder segment connecting the arms intermediate their ends, the terminal parts of the arms and the sleeve being curved in conformity with the curvature of the shaft and supporting member, and the arms including at their medial section portions bulging lengthwise of said shaft.

2. A mounting for a rotary shaft comprising a supporting member encircling the shaft, a recess formed between the shaft and the supporting member, a unitary resilient body disposed in said recess for permanent contact with said shaft and said supporting members and including a plurality of arms, each having a medial portion bulging lengthwise of said shaft and each having terminal portions curved transversely to and in conformity with said shaft, and a cylinder segment for maintaining the said arms in spaced relationship to said shaft, the said arms being of a length substantially equal to the length of said recess.

3. A mounting for a rotary shaft comprising a supporting member encircling the shaft and presenting at its inner face a pair of bearing surfaces for the same, a recess formed between the shaft and the supporting member and intermediate the said bearing surfaces, a unitary resilient body disposed in said recess for permanent contact with said shaft and said supporting member, the said resilient body including a pair of arms having a medial portion bulging outwardly and lengthwise of said shaft and having terminal portions curved transversely to and in conformity with said shaft, and a cylinder segment for maintaining said arms in roughly diametrically opposed relationship on said shaft, the said arms being of a length substantially equal to the length of said recess.

4. A mounting assembly for electrical instruments including, in combination, a shaft, a bushing disposed in concentrical relationship therewith, the shaft having a reduced portion providing a recess between the same and the bushing and presenting bearing surfaces adjacent the ends of said recess, a unitary resilient body disposed in said recess for permanent contact with said shaft and bushing, the said resilient body including a pair of arms, each having a medial portion bulging outwardly and lengthwise of said shaft and having terminal portions curved transversely to and in conformity with said shaft, and a cylinder segment for maintaining said arms in roughly diametrically opposed relationship on said shaft, the said arms being of a length substantially equal to the length of said recess.

GEORGE J. MUCHER.

REFERENCES CITED

The following references are of record in the file of this patent:

UNITED STATES PATENTS

| Number | Name | Date |
|---|---|---|
| 1,588,039 | Monosmith | June 8, 1926 |
| 1,600,928 | Carroll | Sept. 21, 1926 |
| 2,210,473 | Testa | Aug. 6, 1940 |
| 2,415,497 | Johnson | Feb. 11, 1947 |